(12) United States Patent
Dymond et al.

(10) Patent No.: US 8,323,509 B2
(45) Date of Patent: Dec. 4, 2012

(54) REHABILITATION METHOD

(75) Inventors: Brian Dymond, Bradford (GB); John Gerard Bellwood, Jiliby (AU)

(73) Assignee: BASF SE, Ludwigshafen (DE)

( * ) Notice: Subject to any disclaimer, the term of this patent is extended or adjusted under 35 U.S.C. 154(b) by 323 days.

(21) Appl. No.: 12/227,040

(22) PCT Filed: May 1, 2007

(86) PCT No.: PCT/EP2007/054228
§ 371 (c)(1),
(2), (4) Date: Nov. 5, 2008

(87) PCT Pub. No.: WO2007/134952
PCT Pub. Date: Nov. 29, 2007

(65) Prior Publication Data
US 2009/0116908 A1    May 7, 2009

(30) Foreign Application Priority Data

May 19, 2006  (GB) .................................. 0609998.0

(51) Int. Cl.
*B01D 21/01* (2006.01)
(52) U.S. Cl. ........ 210/732; 210/725; 210/727; 210/728; 210/734; 210/735
(58) Field of Classification Search .................... 210/710
See application file for complete search history.

(56) References Cited

U.S. PATENT DOCUMENTS

| | | | |
|---|---|---|---|
| 3,707,523 A | 12/1972 | Ledden et al. | 260/41 |
| 3,718,003 A | 2/1973 | Cook et al. | 61/35 |
| 4,506,062 A | 3/1985 | Flesher et al. | 526/211 |
| 4,528,321 A | 7/1985 | Allen et al. | 524/761 |
| 4,599,379 A | 7/1986 | Flesher et al. | 524/801 |
| 4,611,951 A | 9/1986 | Sapp | 5/128 |
| 4,673,704 A | 6/1987 | Flesher et al. | 524/519 |
| 4,720,346 A | 1/1988 | Flesher et al. | 210/734 |
| 5,043,077 A | 8/1991 | Chandler et al. | 210/698 |
| 5,788,867 A | 8/1998 | Pearson | 210/733 |
| 6,001,920 A | 12/1999 | Ghafoor et al. | 524/500 |
| 6,031,037 A | 2/2000 | Ghafoor et al. | 524/388 |

(Continued)

FOREIGN PATENT DOCUMENTS

EP    0 102 760    3/1984
(Continued)

OTHER PUBLICATIONS

"Using biosolids for reclamation and remediation of disturbed soils." Plant Conservation Alliance, USEPA. Nov. 2002.*
Xu Y et al., Mining Engineering, Nov. 2003, pp. 33-39.

*Primary Examiner* — Krishnan S Menon
*Assistant Examiner* — David Weisz
(74) *Attorney, Agent, or Firm* — Shruti Costales, PLLC

(57) ABSTRACT

A method of rehabilitation of a deposition area to render it suitable for plant growth comprising a particulate mineral material, which particulate mineral material has been dewatered from a suspension of said material, comprising the steps of transferring the suspension of particulate mineral material as a fluid to the deposition area, and in which the suspension is allowed to stand and dewater at the deposition area to form a dewatered particulate mineral material, wherein the rehabilitation of the disposal area is achieved by adding a dewatering amount of a polymer to the suspension of the particulate mineral material while it is being transferred as a fluid to the deposition area, wherein the polymer is either a synthetic water-soluble polymer formed from one or more ethylenically unsaturated monomers having an intrinsic viscosity of at least 4 dl/g or a water-soluble polymer that is a natural polymer or semi natural polymer.

21 Claims, 2 Drawing Sheets

Slump Height At Centre,   c

Slump Height At Edge,     e

Radius,                   r

Slump Angle, %  =  $\frac{c-e}{r} \times 100$

U.S. PATENT DOCUMENTS

| | | | |
|---|---|---|---|
| 6,821,440 B2 * | 11/2004 | Gallagher et al. | 210/732 |
| 7,595,007 B2 * | 9/2009 | Sikes et al. | 252/180 |
| 7,875,188 B2 * | 1/2011 | Dymond et al. | 210/710 |
| 2004/0208709 A1 * | 10/2004 | Marsden | 405/264 |
| 2006/0207946 A1 | 9/2006 | McColl et al. | 210/733 |

FOREIGN PATENT DOCUMENTS

| | | |
|---|---|---|
| EP | 0 126 528 | 11/1984 |
| EP | 0 150 933 | 8/1985 |
| EP | 0 170 394 | 2/1986 |
| EP | 0 202 780 | 11/1986 |
| EP | 0 388 108 | 9/1990 |
| WO | 96/05146 | 2/1996 |
| WO | 98/29604 | 7/1998 |
| WO | 98/31748 | 7/1998 |
| WO | 98/31749 | 7/1998 |
| WO | 01/92167 | 12/2001 |
| WO | 2004/060819 | 7/2004 |

* cited by examiner

Figure 1 – Schematic of the modelled disposal area
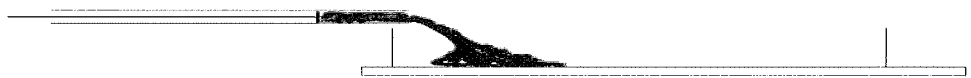
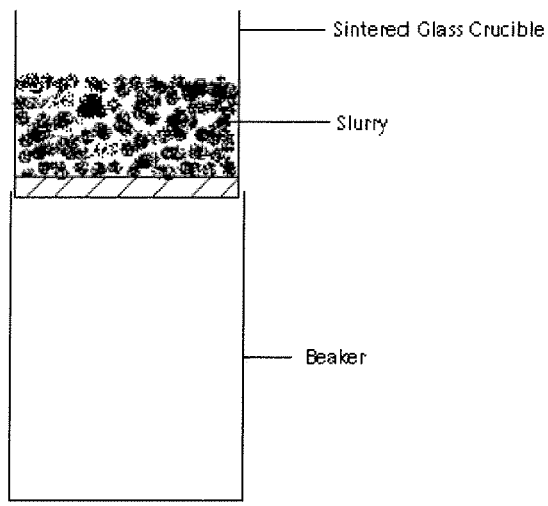
Figure 2
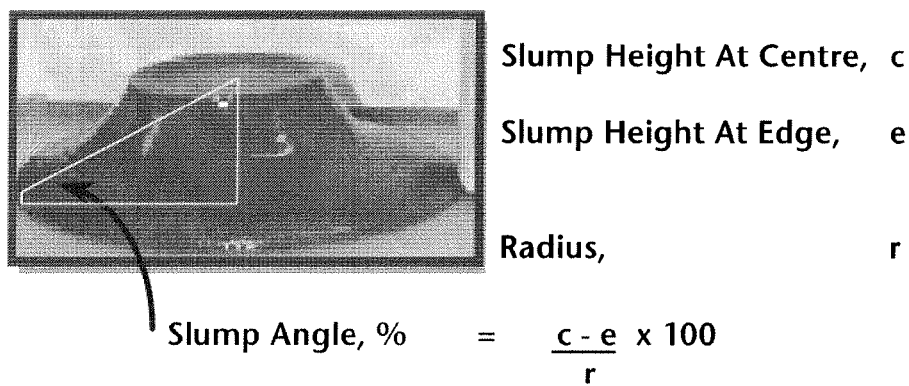
Slump Height At Centre, c
Slump Height At Edge, e
Radius, r
Slump Angle, % = $\dfrac{c - e}{r} \times 100$
Figure 3

Figure 4 - Slurry Drying Profile
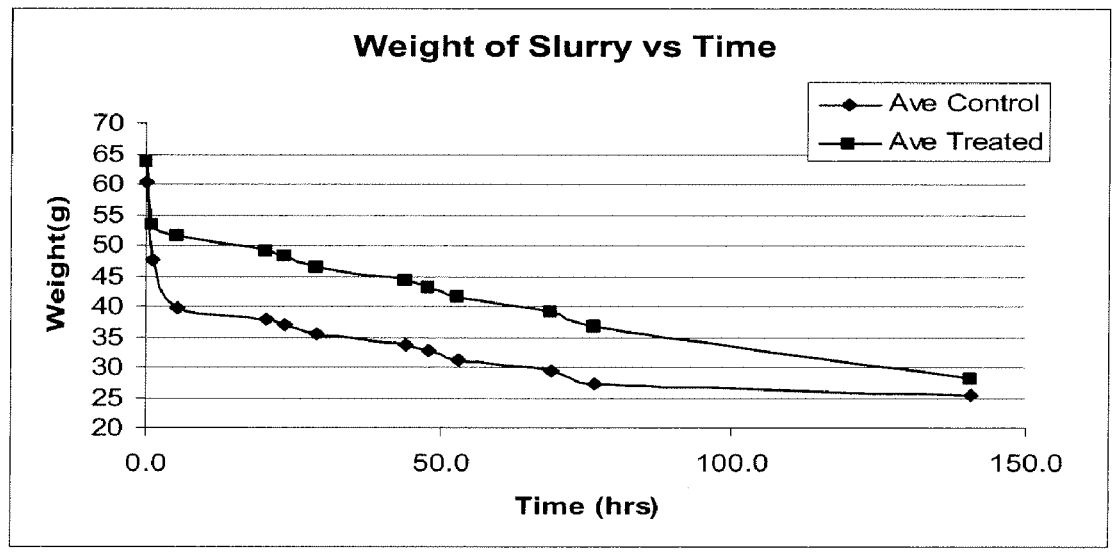
Figure 5
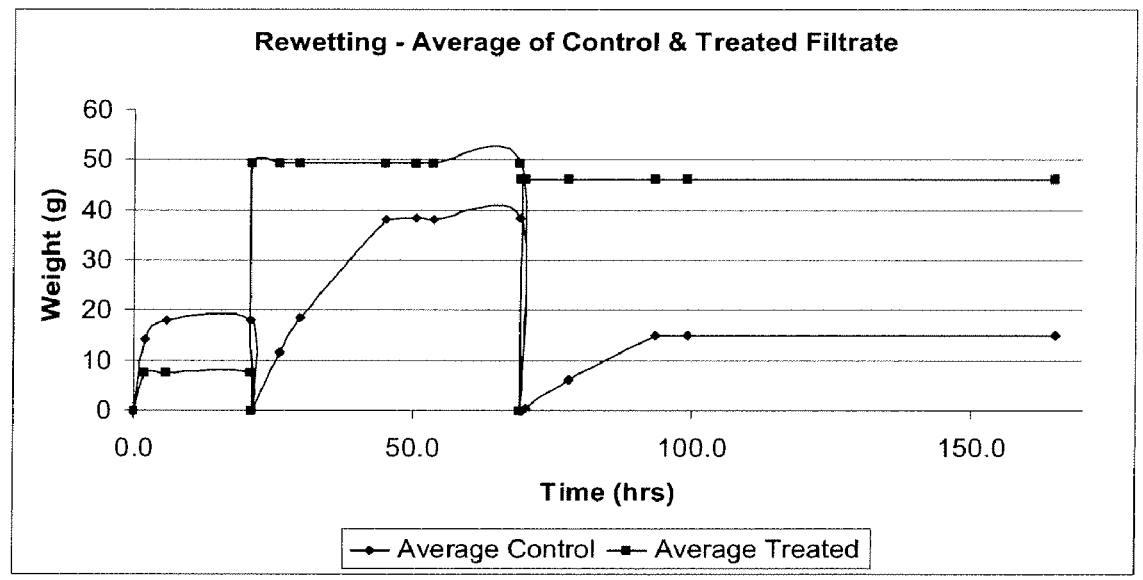

REHABILITATION METHOD

The present invention relates to providing rehabilitated deposition area for particulate mineral material especially with improved plant growth rehabilitation characteristics in which the mineral material that has been dewatered from a suspension, especially waste mineral slurries. The invention is particularly suitable for the disposal of tailings and other waste material resulting from mineral processing and beneficiation processes, including the co-disposal of coarse and fine solids, as a homogenous mixture. By particulate mineral material we include a variety of substrates where mineral material is present. This will include for instance red mud, tailings from a variety of mineral processing operations, and processing of oil sands tailings.

Processes of treating mineral ores in order to extract mineral values will normally result in waste material. Often the waste material consists of an aqueous slurry or sludge comprising particulate mineral material, for instance clay, shale, sand, grit, metal oxides etc admixed with water.

In some cases the waste material such as mine tailings can be conveniently disposed of in an underground mine to form backfill. Generally backfill waste comprises a high proportion of coarse large sized particles together with other smaller sized particles and is pumped into the mine as slurry where it is allowed to dewater leaving the sedimented solids in place. It is common practice to use flocculants to assist this process by flocculating the fine material to increase the rate of sedimentation or retain cement in an admixture. However, in this instance, the coarse material will normally sediment at a faster rate than the flocculated fines, resulting in a heterogeneous deposit of coarse and fine solids.

For other applications it may not be possible to dispose of the waste in a mine. In these instances, it is common practice to dispose of this material by pumping the aqueous slurry to lagoons, heaps or stacks and allowing it to dewater gradually through the actions of sedimentation, drainage and evaporation.

There is a great deal of environmental pressure to minimise the allocation of new land for disposal purposes and to more effectively use the existing waste areas. One method is to load multiple layers of waste onto an area to thus form higher stacks of waste. However, this presents a difficulty of ensuring that the waste material only flows over the surface of previously rigidified waste within acceptable boundaries, is allowed to rigidify to form a stack, and that the waste is sufficiently consolidated to support multiple layers of rigidified material, without the risk of collapse or slip. Thus the requirements for providing a waste material with the right sort of characteristics for stacking is altogether different from those required for other forms of disposal, such as back-filling within a relatively enclosed area. It is normally considered that such disposal areas are unsuitable for any form of rehabilitation since the waste material disposed therein is normally not suitable for any form of construction work or to support vegetation, and is often underground.

In a typical mineral processing operation, waste solids are separated from solids that contains mineral values in an aqueous process. The aqueous suspension of waste solids often contain clays and other minerals, and are usually referred to as tailings. This is true in a variety of mineral solids including tailings from oil sands. These solids are often concentrated by a flocculation process in a thickener to give a higher density underflow and to recover some of the process water. It is usual to pump the underflow to a surface holding area, often referred to as a tailings pit or dam. Once deposited at this surface holding area, water will continue to be released from the aqueous suspension resulting in further concentration of the solids over a period of time. Once a sufficient volume of water has been collected this is usually pumped back to the mineral processing plant.

The tailings dam is often of limited size in order to minimise the impact on the environment. In addition, providing larger dams can be expensive due to the high costs of earth moving and the building of containment walls. These dams tend to have a gently sloping bottom which allows any water released from the solids to collect in one area and which can then be pumped back to the plant. A problem that frequently occurs is when fine particles of solids are carried away with the run-off water, thus contaminating the water and having a detrimental impact on subsequent uses of the water.

In many mineral processing operations, for instance a mineral sands beneficiation process, it is also common to produce a second waste stream comprising of mainly coarse (>0.1 mm) mineral particles. It is particularly desirable to dispose of the coarse and fine waste particles as a homogeneous mixture as this improves both the mechanical properties of the dewatered solids, greatly reducing the time and the cost eventually required to rehabilitate the land. However, this is not usually possible because even if the coarse waste material is thoroughly mixed into the aqueous suspension of fine waste material prior to deposition in the disposal area, the coarse material will settle much faster than the fine material resulting in banding within the dewatered solids. Furthermore, when the quantity of coarse material to fine material is relatively high, the rapid sedimentation of the coarse material may produce excessive beach angles which promotes the run off of aqueous waste containing high proportions of fine particles, further contaminating the recovered water. As a result, it is often necessary to treat the coarse and fine waste streams separately, and recombine these material by mechanically re-working, once the dewatering process is complete.

Attempts have been made to overcome all the above problems by treating the feed to the tailings dam using a coagulant or a flocculant to enhance the rate of sedimentation and/or improve the clarity of the released water. However, this has been unsuccessful as these treatments have been applied at conventional doses and this has brought about little or no benefit in either rate of compaction of the fine waste material or to limit particle size segregation.

Large quantities of particulate material such as tailings from mineral processing operations are discharged as aqueous slurries into lagoons, ponds or dams. The material dries into a mechanically solid form as a result of the combination of evaporation, sedimentation and drainage.

In the Bayer process for recovery of alumina from bauxite, the bauxite is digested in an aqueous alkaline liquor to form sodium aluminate which is separated from the insoluble residue. This residue consists of both sand, and fine particles of mainly ferric oxide. The aqueous suspension of the latter is known as red mud.

After the primary separation of the sodium aluminate solution from the insoluble residue, the sand (coarse waste) is separated from the red mud. The supernatant liquor is further processed to recover aluminate. The red mud is then washed in a plurality of sequential washing stages, in which the red mud is contacted by a wash liquor and is then flocculated by addition of a flocculating agent. After the final wash stage the red mud slurry is thickened as much as possible and then disposed of. Thickening in the context of this specification means that the solids content of the red mud is increased. The final thickening stage may comprise settlement of flocculated slurry only, or sometimes, includes a filtration step. Alternatively or additionally, the mud may be subjected to prolonged settlement in a lagoon. In any case, this final thickening stage is limited by the requirement to pump the thickened aqueous suspension to the disposal area.

The mud can be disposed of and/or subjected to further drying for subsequent disposal on a mud stacking area. To be suitable for mud stacking the mud should have a high solids content and, when stacked, should not flow but should be relatively rigid in order that the stacking angle should be as high as possible so that the stack takes up as little area as possible for a given volume. The requirement for high solids content conflicts with the requirement for the material to remain pumpable as a fluid, so that even though it may be possible to produce a mud having the desired high solids content for stacking, this may render the mud unpumpable.

The sand fraction removed from the residue is also washed and transferred to the disposal area for separate dewatering and disposal.

EP-A-388108 describes adding a water-absorbent, water-insoluble polymer to a material comprising an aqueous liquid with dispersed particulate solids, such as red mud, prior to pumping and then pumping the material, allowing the material to stand and then allowing it to rigidify and become a stackable solid. The polymer absorbs the aqueous liquid of the slurry which aids the binding of the particulate solids and thus solidification of the material. However this process has the disadvantage that it requires high doses of absorbent polymer in order to achieve adequate solidification. In order to achieve a sufficiently rigidified material it is often necessary to use doses as high as 10 to 20 kilograms per tonne of mud. Although the use of water swellable absorbent polymer to rigidify the material may appear to give an apparent increase in solids, the aqueous liquid is in fact held within the absorbent polymer. This presents the disadvantage that as the aqueous liquid has not actually been removed from the rigidified material and under certain conditions the aqueous liquid could be desorbed subsequently and this could risk re-fluidisation of the waste material, with the inevitable risk of destabilising the stack. This technique does not result in dewatering of the suspension and furthermore gives no indication that a form of rehabilitation would be possible.

WO-A-96/05146 describes a process of stacking an aqueous slurry of particulate solids which comprises admixing an emulsion of a water-soluble polymer dispersed in a continuous oil phase with the slurry. Preference is given to diluting the emulsion polymer with a diluent, and which is preferably in a hydrocarbon liquid or gas and which will not invert the emulsion. Therefore it is a requirement of the process that the polymer is not added in to the slurry as an aqueous solution. There is no disclosure that dewatering and rigidification can be achieved sufficient to form stacks of the mineral material by the addition of an aqueous solution of polymer. Furthermore, there is no indication in this document that rehabilitation of the disposal area containing the stacked material could be achieved.

WO-A-0192167 describes a process where a material comprising a suspension of particulate solids is pumped as a fluid and then allowed to stand and rigidify. The rigidification is achieved by introducing into the suspension particles of a water soluble polymer which has an intrinsic viscosity of at least 3 dl/g. This treatment enables the material to retain its fluidity whilst being pumped, but upon standing causes the material to rigidify. This process has the benefit that the concentrated solids can be easily stacked, which minimises the area of land required for disposal. The process also has the advantage over the use of cross linked water absorbent polymers in that water from the suspension is released rather than being absorbed and retained by the polymer. The importance of using particles of water soluble polymer is emphasised and it is stated that the use of aqueous solutions of the dissolved polymer would be ineffective. Very efficient release of water and convenient storage of the waste solids is achieved by this process, especially when applied to a red mud underflow from the Bayer alumina process. Although this technique provides suitable dewatering and rigidification of suspensions of particulate mineral material there is nothing to indicate that rehabilitation of the disposal area can be achieved.

WO2004/060819 describes a process in which material comprising an aqueous liquid with dispersed particulate solids is transferred as a fluid to a deposition area, then allowed to stand and rigidify, and in which rigidification is improved whilst retaining the fluidity of the material during transfer, by combining with the material an effective rigidifying amount of an aqueous solution of a water-soluble polymer. Also described is a process in which dewatering of the particulate solids is achieved. Although this process of the significant improvements in rigidification and dewatering of suspensions of particulate mineral material, there is nothing in this disclosure that indicate any rehabilitation of the disposal area might be possible.

In the case of oil sands processing, the ore is processed to recover the bitumen fraction, and the remainder, including both process material and the gangue, constitutes the tailings that are not valuable and are to be disposed of. In oil sands processing, the main process material is water, and the gangue is mostly sand with some silt and clay. Physically, the tailings consist of a solid part (sand tailings) and a more or less fluid part (sludge). The most satisfactory place to dispose of these tailings would be in the existing excavated hole in the ground. Nevertheless the sand and the sludge components would occupy a larger volume than the ore from which it was processed.

In the process for recovery of heavy oil and bitumen from oil sand deposits, when using open cast mining, the oil or bitumen is extracted either by a hot-water process in which oil sands are mixed with 65° C. (150° F.) water and caustic or by a low-energy extraction process run at lower temperatures without caustic. However, both processes generate large volumes of tailings which consist of the whole oil sand ore body plus net additions of process water less only the recovered bitumen product.

These oil sand tailings can be subdivided into three categories; viz.: (1) screen oversize, (2) coarse or sand tailings (the fraction that settles rapidly), and (3) fine or tailings sludge (the fraction that settles slowly). Thus the oil sands tailing are made up of particles of different sizes.

It is well known to concentrate these oil sand tailings in a thickener to give a higher density underflow and to recover some of the process water as mentioned above.

For example, Xu. Y et al, *Mining Engineering*, November 2003, p. 33-39 describes the addition of anionic flocculants to the oil sand tailings in the thickener before disposal.

U.S. Pat. No. 3,707,523 describes the preparation of the reconstituted landfill by treating a sand with hydrolysed polyacrylamide and then mixing this treated sand with waste slimes from phosphate ore.

U.S. Pat. No. 4,611,951 describes the reclamation of excavated mine sites using waste ore slimes containing a flocculant and draining water from the settled slime bed. This is then sprayed with sand tailings mixed with an aqueous slime containing flocculant and ultrafine clay solids. Following planting seedlings, vegetation was allowed to take place.

U.S. Pat. No. 3,718,003 describes combining fine solids into a deposit of generally coarse mineral tailings in order to improve the fertility of the consolidated material.

It would be desirable to find a method of rehabilitating a deposition area or disposal site which does not necessarily require a flocculant applied to sand alone. It would also be desirable to find a process that avoids pre thickening of slimes. Furthermore, it would be desirable to provide a rehabilitated zone with improved revegetation characteristics.

The prior art also has the disadvantage of requiring specific patterns of physical distribution in order to obtain sand fines which are intermixed and capped. Furthermore, the prior art requires extensive reworking of the solids e.g. by bulldozers and also a considerable period of time in order for untreated material to compact to a suitable solids content.

In addition, it would be desirable to provide a process that avoids multiple treatment stages.

In one aspect of the invention we provide a method of rehabilitation of a deposition area to render it suitable for plant growth comprising a particulate mineral material, which particulate mineral material has been dewatered from a suspension of said material,
comprising the steps of transferring the suspension of particulate mineral material as a fluid to the deposition area, and in which the suspension is allowed to stand and dewater at the deposition area to form a dewatered particulate mineral material,
wherein the rehabilitation of the disposal area is achieved by adding a dewatering amount of a polymer to the suspension of the particulate mineral material while it is being transferred as a fluid to the deposition area,
wherein the polymer is either a synthetic water-soluble polymer formed from one or more ethylenically unsaturated monomers having an intrinsic viscosity of at least 4 dl/g or a water-soluble polymer that is a natural polymer or semi natural polymer.

A further aspect of the invention relates to a novel use of a polymer for the purpose of rehabilitating a deposition area. Thus in this form we provide the use of a polymer in the dewatering of a suspension of particulate mineral material for the purpose of providing a deposition area with improved plant growth rehabilitation characteristics,
in which said polymer is added to the suspension of particulate mineral material while it is being transferred as a fluid to a deposition area and in which the suspension is allowed to stand and dewater at the deposition area to form a dewatered particulate mineral material,
wherein the polymer is either a synthetic water-soluble polymer formed from one or more ethylenically unsaturated monomers having an intrinsic viscosity of at least 4 dl/g or a water-soluble polymer that is a natural polymer or semi natural polymer.

DETAILED DESCRIPTION

Brief Description of the Drawing Figures
FIG. 1 shows a schematic of the modeled disposal area.
FIG. 2 shows an initial percolation test.
FIG. 3 shows how the slump angle is calculated.
FIG. 4 shows a slurry drying profile.
FIG. 5 shows rewetting times in comparison to weight.

In applying the polymer to the suspension of the particulate mineral material as it is transferred as a fluid we find that the dewatered solid material suitably allows rehabilitation of the deposition area. Furthermore the aforementioned disadvantages of the prior art are easily overcome by the invention. By deposition area we mean any area where the aforementioned particulate material can be deposited. This can for instance be any area where waste is deposited from a mineral processing operation. Alternatively, it may be any area that has been excavated, for instance to extract useful material e.g. mineral values including bitumen and in which the excavated area is filled with particulate material treated according to the invention. Generally rehabilitation of the area will include for instance rendering the disposal area suitable for building or other construction or preferably rehabilitation is further achieved by introducing into the deposition area plant, seedlings or seeds suitable for germination. Typically these will be allowed to grow to form a cover of vegetation.

Generally suspended solids may be concentrated in a thickener and this material will for instance leave the thickener as an underflow which will be pumped along a conduit to a deposition area. The conduit can be any convenient means for transferring the material to the deposition area and may for instance be a pipe or a trench. The material remains fluid and pumpable during the transfer stage until the material is allowed to stand.

Desirably the process of the invention is part of the mineral processing operation in which an aqueous suspension of waste solids is optionally flocculated in a vessel to form a supernatant layer comprising an aqueous liquor and an underflow layer comprising thickened solids which form the material. The supernatant layer will be separated from the under flow in the vessel and typically recycled or subjected to further processing. The aqueous suspension of waste solids or optionally, the thickened underflow is transferred, usually by pumping, to a deposition area, which may for instance be a tailings dam or lagoon.

The material may consist of only mainly fine particles, or a mixture of fine and coarse particles. Optionally, additional coarse particles may be combined with the aqueous suspension at any convenient point prior to discharge at the deposition area. Once the material has reached the deposition area it is allowed to stand and dewater and in addition preferably rigidification takes place. The polymer may be added to the material in an effective amount at any convenient point, typically during transfer. In some cases the aqueous suspension may be transferred first to a holding vessel before being transferred to the deposition area. After deposition of the suspension of particulate mineral material it will dewater to form a dewatered solid with reduced dusting characteristics. Preferably the dewatered suspension of particulate mineral material will form a compact and dry solid mass through the combined actions of sedimentation, drainage and evaporative drying.

The surface of the deposited particulate mineral material will reach a substantially dry state. In addition the particulate mineral material will typically be suitably consolidated and firm e.g. due to simultaneous rigidification and dewatering to enable the land to bear significant weight generally necessary for rehabilitation. Prior to rigidification, any of plants, seedlings, seeds suitable for germination, or plant nutrients are introduced into the particulate mineral material.

Suitable doses of polymer range from 10 grams to 10,000 grams per tonne of material solids. Generally the appropriate dose can vary according to the particular material and material solids content. Preferred doses are in the range 30 to 3,000 grams per tonne, more preferably 30 to 1000 grams per tonne, while even more preferred doses are in the range of from 60 to 200 or 400 grams per tonne. The polymer may be added to the suspension of particulate mineral material, e.g. the tailings slurry, in solid particulate form alternatively as an aqueous solution that has been prepared by dissolving the polymer into water or an aqueous medium.

The mineral material particles are usually inorganic. Typically the material may be derived from or contain filter cake, tailings, thickener underflows, or unthickened plant waste streams, for instance other mineral tailings or slimes, including phosphate, diamond, gold slimes, mineral sands, tails from zinc, lead, copper, silver, uranium, nickel, iron ore processing, coal, oil sands or red mud. The material may be solids settled from the final thickener or wash stage of a mineral processing operation. Thus the material desirably results from a mineral processing operation. Preferably the material comprises tailings. Preferably the mineral material would be hydrophilic in nature and more preferably selected from red mud and tailings containing hydrophilic clay, such as oil sands tailings etc.

The fine tailings or other material which is pumped may have a solids content in the range 10% to 80% by weight. The slurries are often in the range 20% to 70% by weight, for instance 45% to 65% by weight. The sizes of particles in a typical sample of the fine tailings are substantially all less than 25 microns, for instance about 95% by weight of material is particles less than 20 microns and about 75% is less than 10 microns. The coarse tailings are substantially greater than 100 microns, for instance about 85% is greater than 100 microns but generally less than 10,000 microns. The fine tailings and coarse tailings may be present or combined together in any convenient ratio provided that material remains pumpable.

The dispersed particulate solids may have a bimodal distribution of particle sizes. Typically this bimodal distribution may comprise a fine fraction and a coarse fraction, in which the fine fraction peak is substantially less than 25 microns and the coarse fraction peak is substantially greater than 75 microns.

We have found better results are obtained in terms of dewatering and rigidification when the material is relatively concentrated and homogenous. The invention nonetheless also provides improved rehabilitation. It may also be desirable to combine the addition of the polymer with other additives. For instance the flow properties of the material through a conduit may be facilitated by including a dispersant. Typically where a dispersant is included it would be included in conventional amounts. However, we have found that surprisingly the presence of dispersants or other additives does not impair the dewatering, rigidification of the material or indeed the rehabilitation of the area into which it is deposited. It may also be desirable to pre-treat the material with either an inorganic or organic coagulant to pre-coagulate the fine material to aid its retention in the dewatered particulate material.

In the present invention the polymer is added directly to the aforementioned suspension of particulate mineral material that is being transferred. The polymer may consist wholly or partially of water-soluble polymer. Thus the polymer may comprise a blend of cross-linked polymer and water soluble polymer, provided sufficient of the polymer is water-soluble or behaves as though it is water-soluble to bring about dewatering on standing. The polymer may be in substantially dry particulate form but preferably is added as an aqueous solution.

The polymer may be a physical blend of swellable polymer and soluble polymer or alternatively is a lightly cross-linked polymer for instance as described in EP202780. Although the polymeric particles may comprise some cross-linked polymer it is essential to the present invention that a significant amount of water soluble polymer is present. When the polymeric particles comprise some swellable polymer it is desirable that at least 80% of the polymer is water-soluble.

The polymer should comprise polymer which is wholly or at least substantially water soluble. The water soluble polymer may be branched by the presence of branching agent, for instance as described in WO-A-9829604, for instance in claim 12, or alternatively the water soluble polymer is substantially linear.

Preferably the water soluble polymer is of moderate to high molecular weight. Desirably it will have an intrinsic viscosity of at least 3 dl/g (measured in 1M NaCl at 25° C.) and generally at least 5 or 6 dl/g, although the polymer may be of significantly high molecular weight and exhibit an intrinsic viscosity of 25 dl/g or 30 dl/g or even higher. Preferably the polymer will have an intrinsic viscosity in the range of 8 dl/g to 25 dl/g, more preferably 11 dl/g or 12 dl/g to 18 dl/g or 20 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionised water) and the whole is diluted to the 100 ml mark with deionised water. The intrinsic viscosity of the polymers are measured using a Number 1 suspended level viscometer at 25° C. in 1M buffered salt solution.

The water soluble polymer may be a natural polymer, for instance polysaccharides such as starch, guar gum or dextran, or a semi-natural polymer such as carboxymethyl cellulose or hydroxyethyl cellulose. Preferably the polymer is synthetic and preferably it is formed from an ethylenically unsaturated water-soluble monomer or blend of monomers.

The water soluble polymer may be cationic, non-ionic, amphoteric, or anionic. The polymers are preferably synthetic and may be formed from any suitable water-soluble monomers. Typically the water soluble monomers have a solubility in water of at least 5 g/100 cc at 25° C. Preferred polymers are either non-ionic or anionic and formed from one or more ethylenically unsaturated monomers. When the polymer is non-ionic it will be formed from one or more non-ionic monomers, for instance selected from the group consisting of (meth) acrylamide, hydroxy alkyl esters of (meth) acrylic acid and N-vinyl pyrrolidone. Typically the anionic polymers are formed from one or more and ionic monomers optionally in combination with one or more and ionic monomers.

Particularly preferred anionic polymers are formed from monomers selected from ethylenically unsaturated carboxylic acid and sulphonic acid monomers, preferably selected from (meth) acrylic acid, allyl sulphonic acid and 2-acrylamido-2-methyl propane sulphonic acid, and their salts, optionally in combination with non-ionic co-monomers, preferably selected from (meth) acrylamide, hydroxy alkyl esters of (meth) acrylic acid and N-vinyl pyrrolidone. Especially preferred anionic polymers include the homopolymer of acrylamide or a copolymer of acrylamide with sodium acrylate.

It may be desirable to use cationic polymers in accordance with the present invention. Suitable cationic polymers can be formed from ethylenically unsaturated monomers selected from dimethyl amino ethyl (meth) acrylate-methyl chloride, (DMAEA.MeCl) quat, diallyl dimethyl ammonium chloride (DADMAC), trimethyl amino propyl (meth) acrylamide chloride (ATPAC) optionally in combination with non-ionic co-monomers, preferably selected from (meth) acrylamide, hydroxy alkyl esters of (meth) acrylic acid and N-vinyl pyrrolidone.

In some instances, it has been found advantageous to separately add combinations of polymer types. Thus an aqueous solution of an anionic, cationic or non-ionic polymer may be added to the above mentioned material first, followed by a second dose of either a similar or different water soluble polymer of any type.

In the invention, the water soluble polymer may be formed by any suitable polymerisation process. The polymers may be prepared for instance as gel polymers by solution polymerisation, water-in-oil suspension polymerisation or by water-in-oil emulsion polymerisation. When preparing gel polymers by solution polymerisation the initiators are generally introduced into the monomer solution.

Optionally a thermal initiator system may be included. Typically a thermal initiator would include any suitable initiator compound that releases radicals at an elevated temperature, for instance azo compounds, such as azo-bis-isobutyronitrile. The temperature during polymerisation should rise to at least 70° C. but preferably below 95° C. Alternatively polymerisation may be effected by irradiation (ultra violet light, microwave energy, heat etc.) optionally also using suitable radiation initiators. Once the polymerisation is complete and the polymer gel has been allowed to cool sufficiently the gel can be processed in a standard way by first comminuting the gel into smaller pieces, drying to the substantially dehydrated polymer followed by grinding to a powder. Alternatively polymer gels may be supplied in the form of polymer gels, for instance as gel polymer logs.

Such polymer gels may be prepared by suitable polymerisation techniques as described above, for instance by irradiation. The gels may be chopped to an appropriate size as required and then on application mixed with the material as partially hydrated water soluble polymer particles.

The polymers may be produced as beads by suspension polymerisation or as a water-in-oil emulsion or dispersion by water-in-oil emulsion polymerisation, for example according to a process defined by EP-A-150933, EP-A-102760 or EP-A-126528.

Alternatively the water soluble polymer may be provided as a dispersion in an aqueous medium. This may for instance be a dispersion of polymer particles of at least 20 microns in an aqueous medium containing an equilibrating agent as given in EP-A-170394. This may for example also include aqueous dispersions of polymer particles prepared by the polymerisation of aqueous monomers in the presence of an aqueous medium containing dissolved low IV polymers such as poly diallyl dimethyl ammonium chloride and optionally other dissolved materials for instance electrolyte and/or multi-hydroxy compounds e.g. polyalkylene glycols, as given in WO-A-9831749 or WO-A-9831748.

The aqueous solution of water-soluble polymer is typically obtained by dissolving the polymer in water or by diluting a more concentrated solution of the polymer. Generally solid particulate polymer, for instance in the form of powder or beads, is dispersed in water and allowed to dissolve with agitation. This may be achieved using conventional make up equipment. Desirably, the polymer solution can be prepared using the Auto Jet Wet (trademark) supplied by Ciba Specialty Chemicals. Alternatively, the polymer may be supplied in the form of a reverse phase emulsion or dispersion which can then be inverted into water.

Where the polymer is added as an aqueous solution it may be added in any suitable concentration. It may be desirable to employ a relatively concentrated solution, for instance up to 10% or more based on weight of polymer in order to minimise the amount of water introduced into the material. Usually though it will be desirable to add the polymer solution at a lower concentration to minimise problems resulting from the high viscosity of the polymer solution and to facilitate distribution of the polymer throughout the material. The polymer solution can be added at a relatively dilute concentration, for instance as low as 0.01% by weight of polymer. Typically the polymer solution will normally be used at a concentration between 0.05 and 5% by weight of polymer. Preferably the polymer concentration will be the range 0.1% to 2 or 3%. More preferably the concentration will range from 0.25% or 0.5% to about 1 or 1.5%.

In the present invention the suspension of particulate mineral material may typically be a waste material from a mineral processing operation.

When aqueous suspensions of fine and coarse particulate materials are being combined for the purposes of co-disposal, the effective amount of the water-soluble polymer solution will normally be added during or after the mixing of the different waste streams into a homogeneous slurry.

Typically the suspension of particulate mineral material may be transferred along a conduit and through an outlet to the deposition area. The suspension of particulate mineral material will then be allowed to dewater at the deposition area. Preferably the suspension of particulate material that has been transferred to the deposition area will also rigidify upon standing. In many cases the deposition area will already contain rigidified mineral material. Suitably the suspension of particulate mineral material upon reaching the deposition area will flow on the surface of previously rigidified mineral material and the material will be allowed to stand and rigidify to form a stack.

Preferably the material will be pumped as a fluid to an outlet at the deposition area and the material allowed to flow over the surface of rigidified material. The material is allowed to stand and rigidify and therefore forming a stack of rigidified material. This process may be repeated several times to form a stack that comprises several layers of rigidified material. The formation of stacks of rigidified material has the advantage that less area is required for disposal.

In a mineral processing operation where a suspension containing solids is flocculated in a thickener in order to separate the suspension into a supernatant layer and an underflow material, the material can typically be treated at any suitable point after flocculation in the thickener but before the material is allowed to stand. Typically the suspension is transferred along a conduit to a deposition area. This is normally achieved by pumping the suspension of particulate mineral material. A suitable and effective dewatering amount of the water-soluble polymer can be mixed with the material prior to or during a pumping stage. Generally this should be sufficient to provide a solid material suitable for rehabilitating the area, in particular where the suspension of particulate material is simultaneously rigidified. In this way the polymer can be distributed throughout the material.

Alternatively, the polymer can be introduced and mixed with the material subsequently to a pumping stage. The most effective point of addition will depend upon the substrate and the distance from the thickener to the deposition area. If the conduit is relatively short it may be advantageous to dose the polymer solution close to where the material flows from the thickener. On the other hand, where the deposition area is significantly remote from the thickener in may be desirable to introduce the polymer solution closer to the outlet. In some instances in may be convenient to introduce the polymer solution into the material as it exits the outlet. Frequently it may be desirable to add the polymer to the suspension before it exits the outlet, preferably within 10 meters of the outlet.

The rheological characteristics of the material as it flows through the conduit to the deposition area is important, since any significant reduction in flow characteristics could seriously impair the efficiency of the process. It is important that there is no significant settling of the solids as this could result in a blockage, which may mean that the plant has to be closed to allow the blockage to be cleared. In addition it is important that there is no significant reduction in flow characteristics, since this could drastically impair the pumpability of the material. Such a deleterious effect could result in significantly increased energy costs as pumping becomes harder and the likelihood of increased wear on the pumping equipment.

The rheological characteristics of the suspension of particulate mineral material as it dewaters is important, since once the material is allowed to stand it is important that flow is minimised and that ideally solidification and preferably rigidification of the material proceeds rapidly. If the material is too fluid then it will not form an effective stack and there is also a risk that it will contaminate water released from the material. It is also desirable that the rigidified material is sufficiently strong to remain intact and withstand the weight of subsequent layers of rigidified material being applied to it. This feature is particularly desirable for rehabilitation of the area in which the material has been deposited.

The present invention tends to enable the formation of a non segregated mixture in a single step. Upon dewatering a supra-aerial layer is formed and this renders it suitable for the growth of vegetation to take place. Furthermore the ratio of coarse sized material to fines is predictable as opposed to conventional techniques in which the degree of interlayering on the whole would be variable. Further advantages over other methods of rehabilitation include a simple approach to providing a rehabilitated zone typically by a single and continuous treatment to a flowing suspension of material to be deposited.

The non-segregated open structure of the treated stack is more permeable to later rainfall which is beneficial to plant growth. This gives a structure closer to that of natural soil. Plants need air, water and nutrients in order to survive and flourish. Without free movement of water and nutrients, anaerobic conditions are produced and plant growth cannot be sustained. It is likely that the structure generated by treatment will be beneficial to vegetative growth, generated via either natural re-vegetation or by hydroseeding. It is also possible to incorporate seeds and nutrients into the final layer of treated material in order to give a simple, single stage process for encouraging surface germination.

Frequently the particulate mineral material e.g. tailings can contain soluble contaminants, for instance high levels of salts, which can be detrimental to plant growth and therefore would hinder rehabilitation. High levels of salts such as NaCl can be present due to the closed circuit mineral processing activity in which salts all washed from the ore, for example in the case of coal tailings. In addition the mineral material may also contain soluble heavy metals which have been leached out of the ore in the mineral processing operation. In the present invention the rigidifying polymer treatment which generates a more permeable structure tends to allow rainwater to more effectively leach out the salts or other soluble compounds by percolation. Therefore due to the open porous structure the action of the rainwater on the rigidified solid tends to reduce the salts present near the surface thereby enabling plant growth and therefore allowing improved rehabilitation.

Preferably the process of the invention will achieve a heaped disposal geometry and will co-immobilise the fine and course fractions of the solids in the material and also allowing any released water to have a higher driving force to separate it from the material by virtue of hydraulic gravity drainage. The heaped geometry appears to give a higher downward compaction pressure on underlying solids which seems to be responsible for enhancing the rate of dewatering. We find that this geometry results in a greater amount of waste per surface area, which is both environmentally and economically beneficial.

It is not possible to achieve the objectives of the invention by adapting the flocculation step in the thickener. For instance flocculation of the suspension in the thickener to provide an underflow sufficiently concentrated such that it would stack would be of a little value since it would not be possible to pump such a concentrated underflow. Furthermore adding polymer into the thickener would not achieve the desired effect of improving suppression of the dewatered mineral material. Instead we have found that it is essential to treat the material that has been formed as an underflow in the thickener. It appears that separately treating the thickened solids in the underflow allows the material to rigidify effectively without compromising the fluidity during transfer.

A preferred feature of the present invention is the rigidification during the release of aqueous liquor that preferably occurs during the dewatering step. Thus in a preferred form of the invention the material is dewatered during rigidification to release liquor containing significantly less solids. The liquor can then be returned to the process thus reducing the volume of imported water required and therefore it is important that the liquor is clear and substantially free of contaminants, especially migrating particulate fines. Suitably the liquor may for instance be recycled to the thickener from which the material was separated as an underflow. Alternatively, the liquor can be recycled to the spirals or other processes within the same plant.

The following examples illustrate the invention.

EXAMPLE 1

Characteristics of Polymer A and B Rheology Modifiers

Characteristics of powder polymers used in examples 2 and 3.
Polymer A was a 50:50 Sodium acrylate/acrylamide copolymer of molecular weight of approx 15,000,000
Polymer B was a 50:50 Sodium acrylate/acrylamide copolymer of molecular weight of approx 10,000,000

EXAMPLE 2

Rehabilitation

Sample Preparation
Grass seed (Dwarf Ryegrass) was chosen as a typical local flora
Substrate 1—A China clay & Sand slurry was selected for this experiment to represent a typical heterogeneous particulate clay tailings.
833.0 g 20% SPS China clay slurry
383.6 g Silver sand (sieved below 1000 µm)
Total of 1205.6 g
SG=1.205
Substrate 2—A 36.6% w/v clay tailings from the New Milton Sand and Gravel Mine, UK.

For each substrate, the rheology modifier dosage was optimised to give a significant improvement in stacking angle and water release, using the following method.

A solution of rheology modifier was prepared as a 0.5% w/w stock solution and was further diluted to 0.25% w/w solution prior to application.

The rheology modifier was added to each slurry at its chosen dose rate of 300 g/t for Substrate 1 and 956 g/t for Substrate 2 and distributed and mixed via a set number of pours from beaker to beaker. The resulting stacking angle was established via the following method.

A rigid collar, of equal diameter and height (63 mm), is placed on a paint roller tray, lined with a sheet of coarse sand paper.

The collar is filled with the mud slurry to the brim and levelled off.

The collar is lifted vertically off the tray, at speed, allowing the mud slurry to slump outwards.

The diameter of the resultant mud slurry cake and the height, both at the edge and in the centre, are then recorded.

The resulting slump angle is calculated as follows.

$$\text{slump angle, \%} = \frac{c-e}{r} \times 100$$

Where c is slump height at centre, e is slump height at edge and r is the radius of the slump. This is shown in FIG. 3.

Result

TABLE 1

| Substrate | Polymer | Rate (g per Tonne) | Slump angle (%) |
|---|---|---|---|
| China Clay and sand | Polymer A | 300 | 134.5 |
| New Milton tailings | Polymer B | 956 | 120 |

Evaluation

Two effective test methods were established to show the benefits of using the invention treatment with respect to rehabilitation of mining sites. It was decided to model a realistic environment by recreating a tailings disposal area on a small scale, and also to look at the treatments effect in a single placement static environment.

Procedure

1) Modelled Disposal Area Methodology:

In order to create a comparable stack size for both treated and control it was necessary to establish an equal stack area. This was achieved by placing 2 rings of 30 cm diameter on top of concrete slabs. A 120 cm long, 4 cm diameter pipe was then mounted on the top of the ring (14 cm above the concrete base) overhanging the lip of the ring by 5 cm.

The slurry was forced through the tube using a rod with a plunger attached to the end, to simulate the slurry being pumped through a pipeline and being deposited into the disposal area. After several days addition the treated slurry formed a heaped stack; the untreated slurry did not. The final addition of slurry had grass seed incorporated into it at the standard rate so as to treat the surface that is covered by the final application.

FIG. 1 shows a schematic of the modelled disposal area.

The 120 cm long, 4 cm diameter pipe was stoppered at one end and 2 L of Substrate 1 (2 kg for Substrate 2) was poured into it via a wide necked funnel. A tightly fitting rubber plunger was then inserted into the open end of the pipe, which is then placed in position above the 30 cm diameter ring. A 150 cm long metal rod is attached to the plunger, and as soon as the stopper is removed from the pipe the rod is used to force the slurry out of the open end, into the ring where it was allowed to find its own level. As the ring sits on a concrete slab, the ring was not sealed to the concrete so free water could slowly drain away. The rings were also under controlled lighting and were subject to 10 hours of light per day.

This method was performed for the treated, and untreated samples for 5 days, with each new addition of slurry laying on top of the previous days. The 5$^{th}$ addition also contained 66 g (33 g/l) of Rye grass seed.

From this point on, the rings were irrigated with 500 g of water every other day spread evenly across the surface. Apart from day 9 for Substrate 1 when germination was noticed and day 8 for Substrate 2 (irrespective of germination) 500 mls of a standard NPK fertilizer was used instead for both treatments.

After 30 days growth for Substrate 1 and 28 days growth for Substrate 2, the biomass was cropped and weighed.

2) Single Placement Static Test Methodology

2 L of each slurry incorporating 66 g Rye grass seed was treated with rheology modifier as per the method above, and poured into a 20 cm diameter 100 μm meshed sieve. This was then placed on a concrete slab, and was subject to light for 10 hours per day. This was done for both the treated and untreated slurries. The samples were irrigated every other day with 100 mls of water evenly spread across the surface.

After 30 days growth the biomass was cropped and weighed.

Two commercial substrates were obtained from mine sites. Rheology modifier treatments were optimised in each case to give a significant improvement in stacking angle and water release. A coal tailings slurry from Kellingley Coal Mine, UK (19.1% solids, SG=1.11, Polymer A @ 700 g/t 15 beaker pours) and a sand & gravel slurry (34.8% Solids, SG=1.21 Polymer B @ 956 g/t 15 beaker pours). The representative China Clay & sand slurry described above was also tested.

Treatment Details:—

TABLE 2

| Substrate | Polymer | Dosage Rate (g per Tonne) | Slump angle (%) |
|---|---|---|---|
| China Clay and sand | Polymer A | 300 | 134.5 |
| Sand & Gravel | Polymer B | 956 | 120 |
| Kellingly Coal tailings | Polymer A | 700 | 83.3 |

Results

Biomass Harvested

TABLE 3

| | Modelled disposal area methodology | | Static Test | |
|---|---|---|---|---|
| Tailings slurry | Untreated | Treated | Untreated | Treated |
| China clay & Sand | 45.5 g | 117.0 g | 0.0 g | 29. g |
| Sand & Gravel | 5.91 | 12.2 | 0.4 g | 1.6 g |
| Kellingly Coal tailings | — | — | 0.4 g | 0.8 g |

EXAMPLE 3

Water Retention

A test was developed to assess the percolation effects of rainwater onto a rheologically modified treatment of the invention for a slurry of clay, sand and water representing a typical mining tailings substrate. This relates to the resistance to capping and therefore moisture retention after rainfall in supporting plant regrowth at a disposal area.

Procedure

A solution of Polymer A was prepared as a 0.5% w/w stock solution and was further diluted to 0.25% w/w solution prior to application.

A 3:7 w/w dry solids ratio of china clay to sand was prepared by mixing dry sand into a slurry of 20% w/v china clay and utilised for each test. The sand was pre-dried at 110° C. and screened at −500+90 um particle size before use.

The rheology modifier was added at a dose rate of 300 g/ton of dry solids to the slurry and distributed and mixed via a set number of pours from beaker to beaker. A control was treated similarly only in the absence of rheology modifier.

These, in duplicate, were poured into a pre-weighed Porosity 1 sintered glass crucibles and allowed to free drain into pre-weighed beakers. FIG. 2 shows the initial percolation test.

Initial Percolation Test

A control and treated test were run in duplicate.

Liquor filtrate weight was measured at 1 hour. The liquor filtrate was oven dried at 110° C. to determine the suspended solids content.

The crucibles were oven dried to determine dry weight. Results are shown in Table 4.

Slurry Drying Profile

A control and treated test were run in duplicate.

Crucibles were placed under timer-controlled lights for several days. The timer-controlled lights were on for 10 hours in each 24-hour period.

Room temperature was controlled between 19 and 22° C.

The crucibles and beakers were weighed intermittently to obtain a slurry drying profile, shown in FIG. 4.

Re-Wetting of the Drained Slurry and Liquor Percolation

The initial percolation test was repeated and slurry drying established. However at 21 hours the slurry was re-wet with 50 grams of water.

At 45 hours any surface water remaining was removed from the slurry and the weight recorded.

At 69 hours the slurry was re-wet for a second time with 50 grams of water.

At 93 hours any surface water remaining was removed from the slurry and the weight recorded.

The crucibles and beakers were weighed intermittently to obtain a percolation profile.

The test was done in duplicate and average results are reported below.

Results

Initial Percolation Test

TABLE 4

Initial percolation test

|  | Control 1 | Control 2 | Treated 1 | Treated 2 |
|---|---|---|---|---|
| Initial mass (g) | 63.6 | 63.6 | 63.6 | 63.6 |
| Filtrate (g) | 19.05 | 19.88 | 10.13 | 9.65 |
| Solids in filtrate (g) | 1.80 | 1.83 | 0.01 | 0.01 |
| % solids in filtrate | 9.44 | 9.21 | 0.13 | 0.11 |
| Final dry weight (%) | 37.00 | 37.10 | 40.51 | 40.96 |

Re-Wetting of Drained Slurries.

TABLE 5

Rewetting - Accumulated Filtrate

| | Time (hours) | Average Control Accumulated Filtrate (g) | Average Treated Accumulated Filtrate (g) | Average Control Surface Water Removed (g) |
|---|---|---|---|---|
| | 0.0 | 0.0 | 0.0 | |
| | 2.0 | 14.3 | 7.5 | |
| | 6.0 | 17.8 | 7.5 | |
| | 21.0 | 17.8 | 7.5 | |
| 1$^{st}$ Rewet | 21.2 | 0.0 | 0.0 | |
| | 21.3 | 0.0 | 49.2 | |
| | 26.3 | 11.5 | 49.2 | |
| | 29.9 | 18.5 | 49.2 | |
| | 45.1 | 38.1 | 49.2 | |
| | 45.2 | 38.1 | 49.2 | 6.0 |
| | 50.6 | 38.3 | 49.2 | |
| | 53.6 | 38.1 | 49.2 | |
| | 69.1 | 38.3 | 49.2 | |
| 2$^{nd}$ Rewet | 69.3 | 0.0 | 0.0 | |
| | 69.4 | 0.0 | 46.1 | |
| | 70.3 | 0.6 | 46.1 | |
| | 77.9 | 6.1 | 46.1 | |
| | 93.4 | 15.0 | 46.1 | 28.5 |
| | 93.6 | 15.0 | 46.1 | |
| | 99.4 | 15.0 | 46.1 | |
| | 165.2 | 15.0 | 46.1 | |

The results were plotted graphically and are shown in FIG. 5.

For the initial percolation test, the results in Table 1 indicate that the untreated slurry lost 9.3% solids in its liquor filtrate as compared to 0.1% in treated slurry indicating that segregation of the fine particles from the course material was occurring in the untreated slurry. From visual observations the treated slurries maintained their homogeneity; however the untreated slurries separated into heavier sand particles at the bottom of the crucible and formed a capped layer of clay at the top.

Slurry drying profile in FIG. 4 shows a slower rate of moisture loss for the treated runs and higher final moisture retention.

From the rewetting tests of slurries, due to surface capping, untreated slurries were significantly slower to allow percolation of water through the dried slurries, as compared to treated slurries (Table 5, FIG. 5). Excess water sat on top of the capped surface of untreated slurries for several days. This contact time allowed some water to penetrate through the dried slurry, however in practice water would have run off the surface and not penetrated. In contrast, no excess water was present on the treated slurry surfaces.

The homogeneous structure of treated slurries allowed water to percolate through in a matter of minutes. Untreated slurries took several days to achieve similar percolation during which time, in practice, an amount of water would also have been lost to surface evaporation. The treated slurries would thus make water more available to sown plants or local flora and encourage growth and rehabilitation.

The invention claimed is:

1. A method of rehabilitation of a deposition area to render it suitable for plant growth comprising a particulate mineral material, which particulate mineral material has been dewatered from a suspension of said material, the method comprising the steps of:
   (i) transferring the suspension of particulate mineral material as a fluid to the deposition area, and in which the suspension is allowed to stand and dewater at the deposition area to form a dewatered particulate mineral material;
   (ii) rehabilitating the deposition area by adding a dewatering amount of a polymer to the suspension of the particulate mineral material while it is being transferred as a fluid to the deposition area;
   (iii) allowing the suspension to form a non-segregated treated stack; and (iv) introducing into the particulate mineral material prior to rigidification any of plants, seedlings, or seeds suitable for germination, wherein the polymer is either a synthetic water-soluble polymer formed from one or more ethylenically unsaturated monomers having an intrinsic viscosity of at least 4 dl/g or a water-soluble polymer that is a natural polymer or semi natural polymer, wherein the synthetic polymer is formed from monomer(s) selected from the group consisting of (meth)acrylic acid, allyl sulphonic acid and 2-acrylamido-2-methyl propane sulphonic acid as the free acids or salts thereof, optionally in combination with non-ionic co-monomers, selected from the group consisting of (meth)acrylamide, hydroxyl alkyl esters of (meth)acrylic acid and N-vinyl pyrrolidone, and wherein the polymer is combined with the suspension at a dose of 10 grams to 10,000 grams per tonne of material solids.

2. A method according to claim 1 in which the polymer is a nonionic or anionic polymer of one or more ethylenically unsaturated monomers.

3. A method according to claim 2 in which the polymer is a homopolymer of acrylamide or a copolymer of acrylamide with sodium acrylate.

4. A method according to claim 1 in which the suspension of particulate mineral material is a waste material from a mineral processing operation.

5. A method according to claim 1 in which the suspension of particulate mineral material is transferred along a conduit and through an outlet to the deposition area.

6. A method according to claim 1 in which the suspension of particulate mineral material that has been transferred to the deposition area rigidifies upon standing.

7. A method according to claim 6 in which the suspension of particulate mineral material upon reaching the deposition area flows over the surface of previously rigidified mineral material.

8. A method according to claim 1 in which the suspension of particulate mineral material is transferred by pumping it through a conduit and the polymer is added subsequently to the pumping stage.

9. A method according to claim 1 in which the suspension of particulate mineral material is transferred by pumping it through a conduit and polymer is added during or prior to the pumping stage.

10. A method according to claim 1 in which the suspension of particulate mineral material is transferred through a conduit having an outlet wherein the polymer is added to the suspension as it exits the outlet.

11. A method according to claim 1 in which the suspension of particulate mineral material is transferred through a conduit having an outlet wherein the polymer is added to the suspension before it exits the outlet.

12. A method according to claim 1 in which the polymer is added in the form of an aqueous solution.

13. A method according to claim 1 in which the polymer is added in the form of particles.

14. A method according to claim 1 in which the mineral material is derived from mineral processing operations and is selected from the group consisting of red mud from a Bayer alumina process, tailings from the extraction of base metals, tailings from the extraction of precious metals, tailings from the extraction of iron, tailings from the extraction of nickel, coal tailings, mineral and oil sands and coal fines.

15. A method according to claim 1 in which the mineral material is hydrophilic in nature.

16. A method according to claim 1 in which the rehabilitation is further achieved by introducing into the deposition area plants, seedlings or seeds suitable for germination.

17. A method according to claim 1 in which the dewatered particulate mineral material is revegetated by hydroseeding.

18. The method according to claim 12 in which the polymer in the aqueous solution is in a concentration of 0.01% by weight.

19. The method according to claim 18 in which the polymer in the aqueous solution is in a concentration between 0.05% and 5% by weight.

20. The method according to claim 1, wherein at least 80% of the polymer is water-soluble.

21. The method according to claim 1, wherein aqueous liquor is released during step (i) and said aqueous liquor is substantially free of contaminants, and wherein said aqueous liquor is recycled.

* * * * *